W. F. ALDERMAN.
TRAP.
APPLICATION FILED NOV. 16, 1912.
1,108,657.
Patented Aug. 25, 1914.
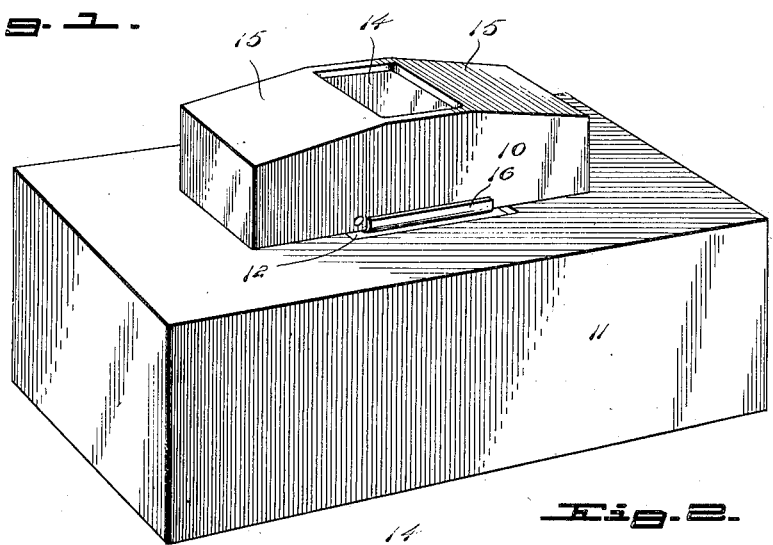
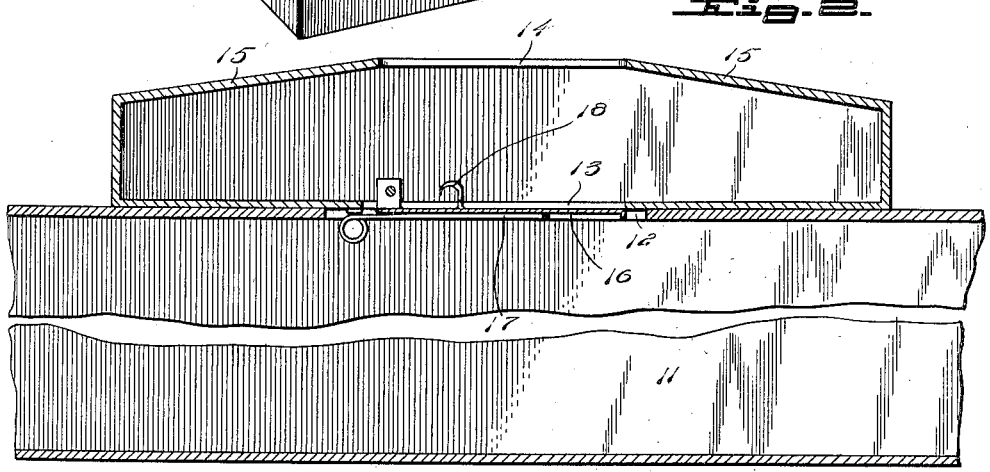
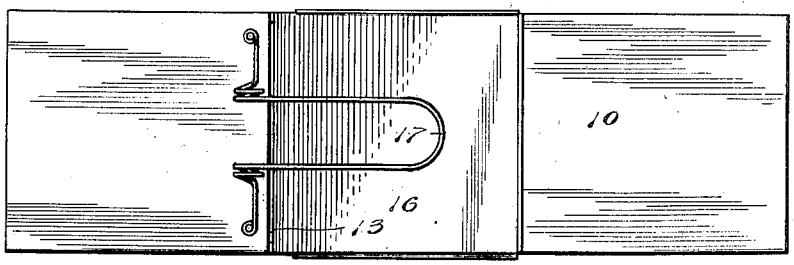
Inventor
W. F. Alderman.
Witnesses
By Victor J. Evans
Attorney

UNITED STATES PATENT OFFICE.

WILLIAM F. ALDERMAN, OF LAKE PARK, GEORGIA.

TRAP.

1,108,657.   Specification of Letters Patent.   Patented Aug. 25, 1914.

Application filed November 16, 1912. Serial No. 731,754.

*To all whom it may concern:*

Be it known that I, WILLIAM F. ALDERMAN, a citizen of the United States, residing at Lake Park, in the county of Lowndes and State of Georgia, have invented new and useful Improvements in Traps, of which the following is a specification.

The invention relates to traps and has for an object to provide a trap for catching rats and other rodents.

The invention embodies, among other features, a casing adapted to rest upon a container and provided with a spring engaged trap door normally closing an opening in the bottom of the casing and which, when an animal passes through an opening in the top of the casing and strikes the trap door, will swing downwardly by the weight of the animal, thus uncovering the opening in the bottom of the casing so that the animal will fall therethrough into the container upon which the said casing is mounted.

In the further disclosure of the invention reference is to be had to the accompanying drawings, constituting a part of this specification, in which similar characters of reference denote corresponding parts in all the views, and in which:

Figure 1 is a perspective view of the device; Fig. 2 is a fragmentary vertical longitudinal sectional view; and Fig. 3 is a bottom plan view of the casing.

Refering more particularly to the views, use is made of a casing 10 adapted to repose upon a container 11 provided with an opening 12 registering with an opening 13 formed in the bottom of the casing 10, the said casing 10 having an opening 14 in the upper face thereof and immediately above the openings 12 and 13 with upper faces 15 of the casing 10 inclined away from the opening 15, as shown. A trap door 16 is mounted to swing on the casing 10, the said trap door being engaged by a spring 17 secured to the under side of the casing 10 to normally hold the trap door in position to close the opening 13 in the casing and the opening 12 in the container, with opposed portions or edges of the trap door projecting through the opening 12 exteriorly of the container, said trap door forming a portion of the bottom of the casing with a hook 18 arranged to project upwardly from the inner end of the trap door 16 and adapted to receive a suitable bait.

In the use of the device described the casing 10 is placed upon the container 11 so that the openings 12, 13 and 14 will register and when the animal passes through the opening 14 to remove the bait on the hook 18, the weight of the animal on the trap door 16 will overcome the tension of the spring 17, thus causing the trap door 16 to swing downwardly and uncover the opening 13, thus causing the animal to fall through the openings 13 and 14 and into the container 11. By referring to the views it will be readily seen that at the moment the animal, after passing through the openings 13 and 14, is free of the trap door 16, the tension of the spring 17 will cause the trap door 16 to return to normal position and close the opening 13 in the casing 10 and the trap will be ready for another animal, it being further seen that the bait secured to the hook 18 will be undisturbed, thus obviating the necessity of rebaiting the trap each time that an animal is caught.

Having thus described my invention, I claim:

In a rat trap, the combination with a substantially rectangular container having a plane upper face provided with a central opening, of a casing reposing on the upper face of the container and provided with an outlet opening registering with the opening in the container, said casing projecting across the central opening of the container but of slightly less width than the opening of the container so as not to completely cover the opening of the container, a plurality of the walls of the casing being inclined toward each other and terminating in a substantially rectangular inlet opening lying immediately above the outlet opening and the opening in the container, a trap door formed of a single flat plate mounted to swing on the casing beneath the inlet opening, with the point of pivotal connection of the trap door with the casing lying within the horizontal plane of the bottom of the casing and with the trap door proper lying within the horizontal plane of the top of the container with edges of the trap door projecting through the uncovered portions of the opening in the container and the said trap door normally closing the greater part of the opening in the container, a bait hook carried by the trap door and projecting from its upper face to normally lie within the casing, and a U-shaped spring having its ends secured to the casing on the under side thereof and on a portion of the casing projecting across the opening of the container, with a medial portion of the spring engaging the under side of the trap door and coiled portions of the spring between its ends depending within the container through the opening formed therein.

In testimony whereof I affix my signature in presence of two witnesses.

WILLIAM F. ALDERMAN.

Witnesses:
　E. J. ZIPPERER,
　H. S. STALVEY.